(12) United States Patent  
Kuenkler (10) Patent No.: US 6,467,724 B2
(45) Date of Patent: Oct. 22, 2002

(54) ARTICULATED DRIVE (76) Inventor: Hermann Kuenkler, Nussbaumweg 19, Ottobrun D-85521 (DE)

( * ) Notice: Subject to any disclaimer, the term of this patent is extended or adjusted under 35 U.S.C. 154(b) by 0 days.

(21) Appl. No.: 09/903,782

(22) Filed: Jul. 11, 2001

(65) Prior Publication Data

US 2002/0003189 A1 Jan. 10, 2002

Related U.S. Application Data (62) Division of application No. 09/341,162, filed as application No. PCT/EP98/00015 on Jan. 2, 1998, now Pat. No. 6,286,783.

(30) Foreign Application Priority Data

Jan. 4, 1997 (DE) .......................................... 197 00 182

(51) Int. Cl.⁷ .............................................. B64C 27/52

(52) U.S. Cl. ..................................... 244/17.25; 244/26

(58) Field of Search .............................. 244/26, 30, 56, 244/66, 12.4, 23 A, 17.25; 416/102, 148

(56) References Cited

U.S. PATENT DOCUMENTS 4,591,112 A * 5/1986 Piasecki et al. ................ 244/26
5,740,987 A * 4/1998 Morris et al. ............. 244/17.25
5,853,145 A * 12/1998 Carter, Jr. ................. 244/17.25

* cited by examiner

Primary Examiner—Peter M. Poon
Assistant Examiner—Timothy D. Collins
(74) Attorney, Agent, or Firm—William Michael Hynes; Townsend and Townsend and Crew, LLP (57) ABSTRACT An aircraft has a fuselage designed essentially as an aerostatic lift body and combined lift and propulsion devices which are articulated on the fuselage, are provided with propellers and form propulsion units and which in each case are tiltable between a lift position, in which the respective propeller rotation plane is essentially horizontal and the output shaft of the associated drive, said output shaft acting on the respective propeller shaft, is essentially vertical, and a propulsion position, in which the respective propeller rotation plane is essentially vertical and the output shaft of the associated drive, said output shaft acting on the respective propeller shaft, is essentially horizontal. The propeller rotation plane has all-round inclinability relative to the output shaft of the associated drive, said output shaft acting on the propeller shaft.

14 Claims, 9 Drawing Sheets

ARTICULATED DRIVE

The invention relates to an aircraft with a fuselage designed essentially as an aerostatic lift body and with combined lift and propulsion devices which are articulated on the fuselage, are provided with propellers and form propulsion units and which in each case are tiltable between a lift position, in which the respective propeller rotation plane is essentially horizontal and the output shaft of the associated drive, said output shaft acting on the respective propeller shaft, is essentially vertical, and a propulsion position, in which the respective propeller rotation plane is essentially vertical and the output shaft of the associated drive, said output shaft acting on the respective propeller shaft, is essentially horizontal.

Aerostatic aircraft provided with translational propulsion systems have long been known, for example, as Zeppelins. These airships can take off and land essentially vertically by virtue of their aerostatic lift behavior, but, since they are predominantly lighter than air, they have to be restrained whenever they are held on the ground. Moreover, these aircraft are relatively sluggish to control, since, because of their slow speed and their small aerodynamic control surfaces, they have low control authority, that is to say high reaction inertia to control movements. Admittedly, airships have recently become known, which have main propulsion systems tiltable comparatively slowly about a transverse axis and laterally acting auxiliary propulsion systems for assisting the aerodynamic control, said propulsion systems reducing the turning circle of an airship, but it has not been possible for the airship to achieve "Pinpoint" maneuverability. Another disadvantage of airships with an elongated streamlined body shape is their extremely high sensitivity to crosswind and the associated requirement to restrain the airship on the ground in such a way that it can turn into the wind in the same way as a boat at a buoy, anchor masts generally being necessary for this purpose.

Furthermore, vertical take-off aircraft are known, the engines of which are tiltable out of a vertical lift position with a horizontal propeller rotation plane and a horizontal propulsion position with a vertical propeller rotation plane. One problem of these vertical take-off aircraft with tiltable engines is the control of the gyroscopic forces which occur when the engines are tilted and which have to be supported via solid supporting structures on the aircraft wings and on the fuselage. On account of these gyroscopic forces, the tilting of the engines can take place only relatively slowly. These vertical take-off aircraft are likewise controlled essentially via aerodynamic control devices. Since, during the vertical take-off of these aircraft, the engines alone have to generate the lift of the aircraft as a whole, the load capable of being transported in addition to the aircraft's own weight is very limited.

The object of the present invention, therefore, is to provide a generic aircraft which combines the advantages of an aerostatic aircraft and the advantages of a vertical take-off aircraft and which is therefore capable of transporting large loads even over relatively long ranges, and which, at the same time, can land quickly and accurately, without a special infrastructure on the ground being required for this purpose.

This object is achieved, according to the defining part of claim 1, in that the respective propeller rotation plane has all-round inclinability relative to the output shaft of the associated drive, said output shaft acting on the propeller shaft.

This inclinability of the propeller rotation plane, in addition to the fundamentally provided tiltability of the propulsion system about a transverse axis, allows thrust vector control of the aircraft, said thrust vector control reacting quickly and giving the aircraft a very agile control behavior even during take-off and landing. This thrust vector control makes it possible (assuming sufficient propulsion system power) to land the aircraft provided with an aerostatic lift body with essentially pinpoint accuracy. This affords the advantage that the aircraft can descend directly on relatively small outside landing areas and can thus, for example, pick up a load in a factory yard and deposit it again directly with the recipient.

The inclination of the rotor plane takes place due to aerodynamic forces acting on the propeller blades, as the result of individual adjustment of the respective angle of incidence of the individual propeller blades. In this case, only the thrust vector for propulsion, lift and control is introduced as a force into the fuselage. Reaction moments occurring during a rapid build-up of the thrust vector, for example gyroscopic moments of an associated engine or of the propeller, are supported on the surrounding air and not on the structure of the aircraft. In this way, the propeller plane is also tiltable relative to the output shaft very quickly in any direction over a large angular sector, without reaction forces which in this case originate from gyroscopic moments having to be transmitted to the fuselage. The angle of inclination of the propeller rotation plane relative to the output shaft of the associated drive, said output shaft acting on the propeller shaft, may amount to between $\pm 20°$ and $\pm 50°$, preferably between $\pm 25°$ and $\pm 35°$ and, for further preference, $\pm 30°$. Since the thrust vector control of the aircraft according to the invention works both in the propulsion position and in the lift position of the propulsion units, complicated restraint of the aircraft on the ground is not necessary for short landing stops, with the propulsion systems still running, since the rapidly reacting thrust vector control allows stabilization of the position of the aircraft on the landing area, even in the event of crosswind or gusts of wind. As a result, the aircraft according to the invention becomes independent of landing platforms or other landing equipment provided on the ground, such as, for example, anchors for securing restraining lines for the aircraft. It may nevertheless be necessary, particularly when the aircraft stops for longer periods during which the engines are switched off, to restrain the aircraft on the ground in the known way. This may be carried out by anchoring a landing foot preferably integrated on the underside of the aircraft, or by means of a rope winch system which is integrated into the fuselage and which can be activated preferably centrally. The rapid-reaction thrust vector control of the aircraft according to the invention also makes it possible to pick up a load, and deposit it with pinpoint accuracy, from the hovering state of the aircraft, without the latter itself having to land.

In a particularly preferred embodiment of the aircraft according to the invention, the fuselage is designed at the same time as an aerodynamic lift body. As a result, during cruising, the fuselage can also generate an aerodynamic lift force in addition to the aerostatic lift.

In the aircraft according to the invention, actively actuable aerodynamic control devices dependent on the dynamic pressure in flight may be dispensed with, so that there is no need to provide any horizontal elevator or rudder units which would increase the crosswind sensitivity and gust sensitivity of the aircraft, even though they do not essentially cooperate in controlling the aircraft in flight at low speed in the take-off phase and the landing phase, which is why this control is performed solely by the thrust vector control. The aircraft may thereby be designed with a consistently simple shape.

If the fuselage has an essentially circular plan, then, on the one hand, assuming the same length, because of the larger volume a substantially increased lift is achieved, as compared with the cigar-like shape of an airship of conventional type, thus leading indirectly to a higher payload, and, on the other hand, assuming the same volume, the wetted surface of the outer skin is reduced, thus leading to a weight reduction and diminishing the frictional resistance. Moreover, crosswind sensitivity is thereby substantially reduced.

It is advantageous, at the same time, if the fuselage has an essentially elliptic cross section, with the result that the flow resistance in horizontal flight is markedly reduced.

If the fuselage cross section is designed with an asymmetric, essentially elliptic shape, the upper part forming an upper shell which is curved to a greater extent than the flatter lower part forming a lower shell, then, during cruising, the fuselage also contributes, in the horizontal position, not only to the aerostatic lift, but additionally to an aerodynamic lift which replaces the rotor lift used during take-off and landing. Moreover, the different curvature leads to a more balanced structural load in the upper shell and the lower shell of the asymmetric discus-like fuselage.

Preferably, the fuselage has, in the equatorial region, at least one rim-like reinforcing ring which forms a horizontal stiffening of the fuselage, in that said reinforcing ring absorbs the radial forces of the upper shell and of the lower shell and additionally, for example, supports dynamic pressure forces impinging on the fuselage on the leading edge side.

At the same time, it is advantageous, in particular, if the reinforcing ring has, in cross section, a part-elliptic shape on its outer circumference. The reinforcing ring is thereby adapted, in cross section, to the shape of the fuselage cross section in the equatorial region.

The embodiment is also advantageous in which the reinforcing ring has a composite fiber material, preferably of the sandwich type. This achieves, along with high strength and low weight, a desired elasticity which allows the reinforcing ring to experience deformation within predetermined limits. By virtue of this elastic deformation, for example, forces and moments introduced into the reinforcing ring from a propulsion support structure can be taken over and transferred by the fuselage envelope structure which, on account of the largest possible lever arms and the natural dimensional rigidity of the pressurized elliptic discus-like fuselage, is particularly suitable for this purpose. The main function of the rim-like reinforcing ring is to absorb the radial forces from the envelope structure for the purpose of the horizontal stiffening of the discus-like fuselage.

It is advantageous for the resultant compression loads to be absorbed by two compression-resistant supporting profiles with high specific compressive strength, which are integrated into the reinforcing ring and to which preferably also the support structure of the upper shell and of the lower shell of the fuselage is anchored.

In order to limit the desired radial elasticity, the reinforcing ring may have at least one supporting skeleton which is advantageously designed as a framework which, in cross section, is preferably of essentially triangular design, two of the corners being formed by the supporting profiles integrated into the reinforcing ring, and the vertex of the triangle pointing toward the inside of the fuselage.

It is advantageous if the supporting skeleton is integrated at least partially into the reinforcing ring.

If, according to a further advantageous embodiment of the invention, in each case two propulsion units are jointly mounted in a supporting structure preferably attached nonrigidly to the fuselage, then bending moments, which result, during the take-off and landing phases, from the lifting thrust of the individual propulsion system and the projecting attachment of the propeller axis, can be guided directly from one propulsion unit to the other, without these forces having to be transmitted through the entire fuselage structure. The two drive units are thus supported relative to one another via their supporting structure.

The respective propulsion units and/or their supporting structures together with the propulsion units assigned to them are preferably coupled nonrigidly to one another via thrust struts, to form a propulsion support frame which is twistable and distortable as a result of its nonrigid connections.

Preferably, the propulsion units and/or their supporting structures are attached nonrigidly to the rim-like reinforcing ring. The propulsion units are thereby integrated into the propulsion support frame which is attached nonrigidly to the rim-like reinforcing ring. This embodiment ensures that the forces emanating from the individual propulsion units are largely transferred via the propulsion support frame and therefore the reinforcing ring and the fuselage envelope structure are relieved of the transfer of these forces. In addition, vibrational uncoupling is assisted thereby.

If the front propulsion units and the rear propulsion units are in each case located at a different distance from the longitudinal center plane, this ensures that the rear propulsion units do not lie in the vortex trail of the front propulsion units.

Additionally or alternatively to this, the front and rear propulsion units may also be arranged at different heights on the aircraft, in order to achieve the same or a more improved effect in this respect.

In a particularly preferred design of the invention, the aircraft is provided with four propulsion units which, for further preference, are in each case provided in pairs on a supporting structure. Advantageously, in each case, a propulsion unit is provided in the region of one corner of an imaginary quadrangle (or another polygon, depending on the number of propulsion units) which surrounds or partially penetrates the circular plan of the aircraft.

Preferably, two engines capable of being operated in parallel with one another are provided in each propulsion unit.

Redundancy is thereby achieved within each individual propulsion unit, and, even if an engine of a propulsion unit fails, this redundancy also allows the propulsion unit as a whole to operate reliably, with only a slight overall loss of thrust. The operating safety of the aircraft is thereby increased, since the risk of a complete failure of an entire propulsion unit is greatly reduced because of the duplication of the engines. The arrangement of four twin-engine propulsion units of this type gives full propulsion redundancy, even if an engine were to fail during take-off with a maximum take-off mass, that is to say in vertical flight. If a complete propulsion unit fails during take-off, only two propulsion units located diagonally opposite one another provide lift and, in the case of a maximum take-off mass, make it possible to maintain an only insignificant descent speed, the third operational propulsion unit being used for stabilizing the aircraft about the roll axis and about the pitch axis. If, in the case of such a loss of propulsion, a sufficient flight altitude has already been reached, a transition to cruising can be carried out. During cruising, too, the aircraft provided with four propulsion units in the way claimed remains fully airworthy and maneuverable if a propulsion unit fails completely, since, in this case, it is ensured that there is still one propulsion unit operational on each side of the aircraft with respect to the longitudinal center plane, the third operational propulsion unit also being used for regulating the flight attitude.

A cargo compartment for the transport of cargo is preferably designed in the lower region of the fuselage, below which cargo compartment a landing foot preferably of platform-like design can be extended.

In an advantageous embodiment, the cargo compartment is provided with at least one ramp, and preferably two ramps can be provided on two sides facing away from one another. The provision of one ramp makes it easier for the aircraft to be loaded and unloaded and the provision of two ramps located on sides facing away from one another allows more rapid loading and unloading in the so-called RORO mode (roll-on/roll-off).

If a pneumatically extendable bellows-like annular bead is provided, directed downward, as a landing foot below the cargo compartment in the region of the circumference of the latter, then, on the one hand, landing impact can be cushioned by the landing foot formed by this annular bead and, on the other hand, because of the low specific surface pressure, landing on unconsolidated ground may also take place. In order to set a specific height, the pneumatically extendable annular bead has integrated height limitation.

In another embodiment of the aircraft according to the invention, a passenger cabin, preferably having a two-story design in places, is provided in the front part of the equatorial region of the fuselage, so that the aircraft can be used as a means of passenger transport.

Preferably, in this case, the passenger cabin is suspended in the rim-like reinforcing ring and preferably also in the front supporting structure of the propulsion support frame.

In a preferred embodiment, a baggage and freight compartment is provided in the rear part of the equatorial region of the fuselage. This arrangement of the baggage and freight compartment in the rear part of the aircraft ensures, together with the passenger cabin provided in the front part of the aircraft, that the basic trim of the aircraft is as balanced as possible.

Preferably, the baggage and freight compartment is suspended in the rim-like reinforcing ring and preferably also in the rear supporting structure of the propulsion support frame.

In an advantageous development, there is provided in the lower shell a central body which is integrated into the latter and on the underside of which preferably a bellows-like pneumatically extendable annular bead is designed as a landing foot.

If the central body is suspended in the envelope structure of the fuselage, said envelope structure being formed by the upper shell and by the lower shell, in such a way that, in the event of a hard landing, said central body can spring upward and thus makes it possible to cushion the passenger cabin, baggage and freight compartment and propulsion support frame, landing impacts are kept away from the passenger cabin and consequently from the passengers and also from the baggage and freight compartment and the propulsion support frame.

Preferably, the central body is provided with at least one ramp for access from outside.

If the passenger cabin and the baggage and freight compartment are connected to the central body via encased transport links, then connecting passages screened off from the surrounding fuselage interior are produced between the central body and the passenger cabin as well as the baggage and freight compartment. If the connection between the transport links and the central body is of nonrigid design, the springing of the central body becomes possible. In this case, at least two, preferably three transport links may be provided.

In a further preferred embodiment, the fuselage has a support structure and a fuselage envelope, the fuselage envelope being heatable, at least in portions, in the region of the upper shell. This heating, in particular on that side of the upper shell which faces the inside of the fuselage, causes the fuselage envelope to be deiced, with the result that the operating safety of the aircraft in use during bad weather is appreciably increased.

Advantageously, the heatable portions of the fuselage envelope may be of double-walled design and have flowing through them, as required, warm air or another gas which is warmer than the fuselage surroundings. For this purpose, either the waste heat of the engines may be used or additional independent heating devices may be provided. It is also advantageous if the pressure within the fuselage envelope is capable of being modulated. This embodiment assists effective deicing of the fuselage envelope and is consequently conducive to the aircraft operating safely in bad weather.

In another particularly preferred embodiment of the aircraft according to the invention, central, preferably digital control is provided for the individual or collective control of the angles of incidence of the propeller blades of all the propulsion units for preferably exclusive attitude control and for flight control in the vertical take-off and landing mode, in the horizontal cruising mode and in the transitional mode between these two operating conditions. This central control ensures a stable flight behavior which is guaranteed at all the operating conditions of the aircraft and thus relieves the pilots of this task.

Additional manual flight control may be provided as redundancy for this central control, said manual flight control enabling the pilot to stabilize the flight behavior of the aircraft in the event of a failure of central control.

The thrust vector control in the aircraft according to the invention is provided by a propulsion unit having at least one propeller, in which the propeller rotation plane is designed to be inclinable relative to the drive output shaft acting on the propeller shaft, uniformity in the rotational movement of the propeller being achieved in that the propeller shaft and the drive output shaft acting on the propeller shaft are connected to one another in an articulated manner, preferably via a double cardan joint or a synchronous joint. This inventive embodiment of a propulsion unit additionally achieves, independently of the tilting state of the propeller rotation plane between the lift position and the propulsion position, all-round effective inclinability of the propeller rotation plane in the form of an imaginary disk which allows a rapid and immediately effective change in the thrust vector. This special embodiment of a propulsion unit, with a propeller rotation plane inclinable all-round relative to the drive output shaft, can be used not only on the aircraft described in this application, but for aircraft in general or, for example, also for vessels, when the effective direction of a thrust vector emanating from a rotating propulsion unit is to be changed quickly.

For practical use, preferably in aircraft, in addition to the primary suitability for use in the highly agile thrust vector control of propeller propulsion units, there are the following advantages:

The propeller plane can in each case be oriented perpendicularly to the air flow direction, irrespective of the attitude or aircraft position.

In the case of the approach of a crosswind, a compensating trimming thrust component can be built up.

Even when the air flow direction is oblique to the propeller plane, no bending moment acts on the propeller shaft, since the build-up of a tilting moment of the propeller plane is eliminated by means of the cyclically individual blade setting.

It is advantageous, at the same time, if the hub of the propeller is cardanically mounted via a cardan ring, with the result that the propeller rotation plane inclinability making thrust vector control possible is achieved.

In a preferred development of this propulsion unit, the propeller blades are arranged on an associated propeller hub without flapping hinges and without lag hinges or other elastic parts acting in an equivalent way to these.

In this case, the angle of incidence of the individual propeller blades is adjustable, preferably by means of a swashplate, collectively as well as individually variably relative to the inclination of the propeller rotation plane. This arrangement of the propeller blades and the control of their angles of incidence via a swashplate bring about an inclination of the propeller rotation plane which directly follows the change in the angle of incidence of the propeller blades (pitch change), with the result that the desired thrust vector change for controlling the aircraft is achieved.

In this case, the cyclic change in the blade angles of incidence takes place via the swashplate, as in the case of the helicopter rotor. In contrast to this, however, the blade roots of the propeller blades do not have to continue to be adjusted cyclically after the conclusion of the dynamic operation of tilting the propeller plane into a plane perpendicular to the air flow direction, since, in contrast to the rotor hub fixed to the helicopter, the propeller hub has been tilted jointly with the propeller rotation plane relative to the output shaft. In this embodiment of the subject of the invention, the swashplate, the propeller hub and the propeller blades rotate in planes parallel to one another again after the tilting operation.

Admittedly, in principle, the angle of inclination of the propeller rotation plane relative to the output shaft of the associated drive, said output shaft acting on the propeller shaft, may amount to between ±20° and ±50°, preferably between ±25° and ±35° and, for further preference, ±30°, as has already been stated. However, if the angle of inclination of the propeller rotation plane relative to the output shaft of the associated drive, said output shaft acting on the propeller shaft, amounts up to more than ±45°, then, with the propulsion unit being suitably attached obliquely to a craft, both a lift position and a propulsion position can be set solely by inclining the propeller rotation plane.

Preferably, however, a tilting mechanism for mounting the propulsion unit on a craft is provided, said tilting mechanism allowing the propulsion unit to tilt about a tilting axis between a lift position, in which the output shaft is oriented essentially vertically, and a propulsion position, in which the output shaft is oriented essentially horizontally. This tilting of the propeller rotation plane out of the horizontal position (lift position) into the vertical position (propulsion position), and vice versa, during the transitional phases, that is to say, for example, in the case of the aircraft, the respective transitional phases between vertical flight and horizontal flight, is likewise induced by the individual control of the angles of incidence of the propeller blades via fluid-dynamic forces and causes the output axis of the propulsion system to tilt about the tilting axis, for example an axis parallel to the transverse axis of the aircraft.

Preferably, a tracking device is provided, which follows a tilting movement of the propulsion unit, in particular the propeller rotation plane, occurring due to fluid-dynamic forces acting on the propeller and to resultant gyroscopic forces, and which assists this tilting movement, preferably without any reaction force. The tracking device, in this case, follows, with a markedly lowered adjusting speed (approximately the factor 5), the tilting movement of the propeller rotation plane which commences due to the fluid-dynamic forces acting on the propeller (these are aerodynamic forces in use on an aircraft) and due to the resultant gyroscopic forces.

In an alternative embodiment, the propeller hub is mounted in a uniaxial inclination joint, the inclination axis of which runs perpendicular to the tilting axis of the propulsion unit, so that the inclinability of the propeller hub about the inclination axis, together with the tiltability of the propulsion unit about the tilting axis of the propulsion unit, allows the propeller rotation plane to be inclined in all directions, the adjusting speed of the tracking device for the tilting movement about the tilting axis of the propulsion unit essentially corresponding to the adjusting speed of the fluid-dynamically induced inclining movement of the propeller rotation plane, in order to achieve a tilting movement essentially free of reaction force. The cardanic mounting, specified further above, of the propeller hub may be dispensed with in this design.

In a preferred development, there is integrated into the propeller hub a reduction gear which is preferably designed in the manner of a planetary gear and is acted upon rotationally by the output shaft of the drive, preferably via the double cardan joint or the synchronous joint, and which transmits the rotational speed of the output shaft, reduced, to the propeller hub. The double cardan joint or the synchronous joint for the propeller drive is thereby relieved of very high moments which may occur, in particular, during operation with a propeller of large diameter.

This embodiment of the propulsion unit according to the invention, because of its propeller rotation plane inclination caused by the variable-pitch setting of the angle of incidence of the rotor blades, ensures that the propeller rotation plane is deflected out of its current position without any reaction force and, consequently, that the thrust vector is changed without any reaction force. In this embodiment, therefore, no gyroscopic moments have to be supported on the fuselage, so that complicated and heavy supporting structures and corresponding reinforcements in the fuselage may also be dispensed with, even when rapid thrust vector changes are required for agile flight control and attitude control.

The invention relates, furthermore, to a method for controlling an aircraft having a propeller propulsion system, the angle of incidence of the individual propeller blades of each propeller being cyclically set individually, and, thereupon, the propeller rotation plane being inclined without any reaction force, said inclination being induced by aerodynamic forces and by gyroscopic forces resulting from these. This method allows the rapid-reaction control of a propeller aircraft which as a result, particularly in the low flying speed range, allows more rapid changes in direction than with the conventional aerodynamic control via elevators, rudders and ailerons.

Figure 1:
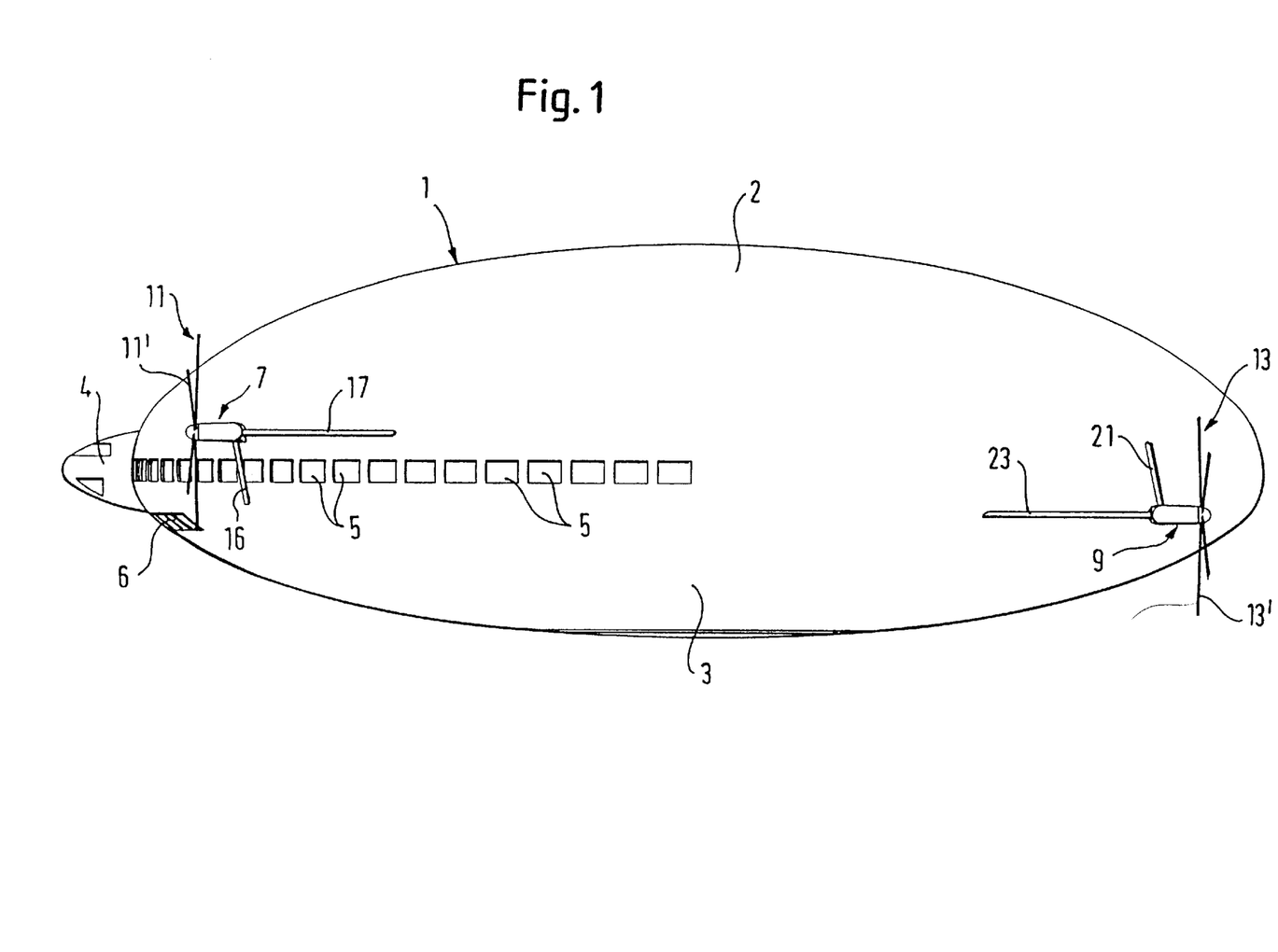
FIG. 1 shows an aircraft according to the invention in a passenger transport version in the cruising flight condition.

The invention is explained in more detail below by means of an example, with reference to the drawing in which:

FIG. 1 shows a side view of a passenger transport version of an aircraft according to the invention in the cruising flight condition. The aircraft possesses a fuselage 1 which is designed essentially as an aerostatic lift body and which is filled predominantly with a gas which is lighter than air, preferably helium.

The fuselage 1 is designed as an ellipsoid of revolution and thus has an essentially circular plan and an elliptic cross section. That part of the fuselage 1 which is upper with respect to the equatorial plane of the fuselage 1 and is termed the upper shell 2 is curved to a greater extent than the lower part of the fuselage 1 which is located below the equatorial plane and is termed the lower shell 3 and which is of substantially flatter design and therefore has a smaller height than the upper shell 2.

Figure 2:
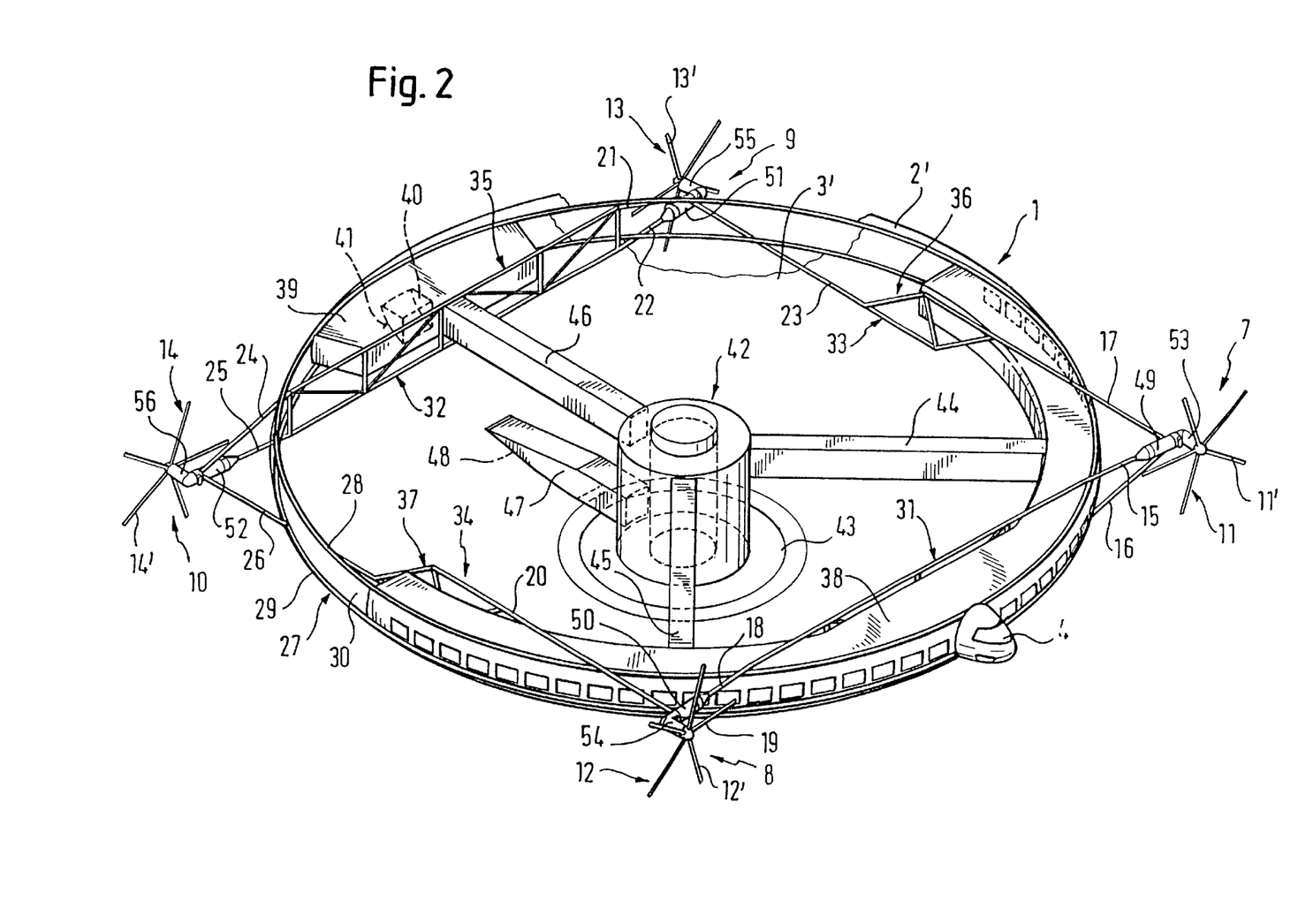
FIG. 2 shows an isometric sectional view of an aircraft according to the invention in a passenger transport version.

Although the fuselage 1 is of circular design, as seen in a plan view, it possesses a defined front side, as seen in the direction of flight, said front side being determined by a cockpit extension 4 which is attached in a nose-like manner at a location on the equatorial circumference of the fuselage 1. The front half of the equatorial circumference of the fuselage 1 is provided with windows 5, formed in the fuselage wall, of the upper story of a two-story passenger cabin 38 (FIG. 2). Another row of windows of the lower story, which are designed as panorama windows 6, is arranged in the foremost region of the fuselage 1 below the cockpit extension 4 and laterally of the latter. Two front propulsion units 7, 8 and two rear propulsion units 9, 10 are arranged laterally of the fuselage 1.

The front propulsion units 7, 8 are in each case provided with a propeller 11, 12 which is directed forward in the direction of flight and is designed as a traction propeller and the propeller blades 11', 12' of which are designed in the same way as propeller blades of a conventional aircraft airscrew. The propeller diameter is in the region of the diameter of helicopter rotors.

The rear propulsion units 9, 10 possess a propeller 13, 14 which points rearward with respect to the direction of flight and which is designed as a pusher propeller. The propeller blades 13', 14' of the rear propulsion units 9, 10 are likewise designed in an airscrew-like manner and the diameter of the rear propellers 13, 14 corresponds approximately to the diameter of the front propellers 11, 12.

The front propulsion units 7, 8 are attached to the fuselage via respective transverse links 15, 16 and 18, 19 and longitudinal links 17 and 20.

The rear propulsion units 9, 10 are attached to the fuselage via respective transverse links 21, 22 and 24, 25 and respective longitudinal links 23 and 26.

The front propulsion units 7, 8 are located above the equatorial plane of the fuselage 1 and the rear propulsion units 9, 10 are located below the equatorial plane of said fuselage.

FIG. 2 is an isometric sectional view of an aircraft according to the invention in a passenger transport version, the fuselage envelope 2' of the upper shell 2 being for the most part cutaway and the fuselage envelope 3' of the lower shell 3 being cutaway in the region of the rear left propulsion unit 9.

Provided in the equatorial region of the fuselage 1 is a rim-like reinforcing ring 27 which has a continuous compression-resistant supporting profile 28, 29 in each case at its upper edge and at its lower edge. Between the continuous supporting profiles 28, 29 is provided an annular wall 30 which connects the upper supporting profile 28 and the lower supporting profile 29 to one another. The design of the reinforcing ring 27 is described in detail further below with reference to FIG. 7.

The front propulsion units 7, 8 are connected to one another via a framework-like front supporting structure 31, the front upper transverse links 15, 18 and the front lower transverse links 16, 19 forming elements of the front supporting structure 31.

The rear propulsion units 9, 10 are connected to one another via a rear supporting structure 32, the rear transverse links 21, 22, 24, 25 forming elements of the rear supporting structure 32.

The front longitudinal links 17, 20 of each side of the aircraft are connected to the rear longitudinal links 23, 26 of the same side, a framework-like structure 33, 34 being provided in the region of the respective connection point, in order to compensate for the different heights of the propulsion units and, consequently, of their longitudinal links.

The longitudinal links 17, 23 and 20, 26, together with their associated framework-like connecting structures 33 and 34, form in each case a left thrust strut 36 and a right thrust strut 37.

The front supporting structure 31, the rear supporting structure 32, the left front longitudinal link 17, the left rear longitudinal link 23, their left framework-like connecting structure 33, the right front longitudinal link 20, the right rear longitudinal link 26 and their right framework-like connecting structure 34 together form a propulsion support frame 35 which connects the four propulsion units 7, 8, 9 and 10 to one another, the respective longitudinal links 17, 23, 20, 26 being connected nonrigidly to the associated supporting structures 31, 32, in order to make it possible for the propulsion support frame to be distortable and twistable.

The propulsion support frame 35 is suspended non-rigidly on the rim-like reinforcing ring 27 in the region of the front and rear supporting structures 31, 32 and of the left and right thrust struts 36, 37, in order, here too, to allow distortability between the propulsion support frame 35 and the rim-like reinforcing ring 27.

Provided in the front part of the fuselage 1 is a semiannular passenger cabin 38 which is suspended on the rim-like reinforcing ring 27 and on the propulsion support frame 35, in particular on the front supporting structure 31 of the latter. The windows 5 of the passenger cabin 38 are formed in the front part of the reinforcing ring 27 in the annular wall of the latter.

A baggage and freight compartment 39 for freight and the passengers, baggage is provided in the rear part of the fuselage 1. The baggage and freight compartment 39 is suspended on the reinforcing ring 27 and on the rear supporting structure 32. The baggage and freight compartment 39 is provided on its underside with a well 40 which leads from the bottom of the baggage and freight compartment 39 to the wall of the lower shell 3. The well 40 is capable of being closed on its underside by a flap 41 mounted in the wall of the lower shell 3. A rope assembly or elevator, not illustrated in FIG. 2, is provided in the baggage and freight compartment 39 in the region of the well 40, in order to lower freight from the baggage and freight compartment 39 to the surface of a landing area or to transport freight from there into the aircraft.

Provided in the middle of the fuselage is a cylindrical central body 42 which stands on a landing foot 43 formed on the underside of the lower shell 3 and which is connected via encased transport links 44, 45, 46 to the passenger cabin 38 and to the baggage and freight compartment 39. The central body 42 extends at least into t he region of the equatorial plane or slightly beyond this, although a clear vertical distance between the topside of the central body 42 and the wall of the upper shell 2 is provided. The central body 42 is suspended in the envelope structure of the fuselage 1, said envelope structure being formed by the upper shell 2, lower shell 3 and reinforcing ring 27, in such a way that, in the event of a hard landing of the aircraft, said central body can spring upward and thus make it possible to cushion the passenger cabin 38, baggage and freight compartment 39 and drive carrier frame 35, the transport links 44, 45, 46 also being connected nonrigidly to the central body 42, in order to allow the latter to exert a springing action.

Provided in the lower region of the lower shell 3 is an encased corridor 47 which leads radially outward from the central body 42 to the wall or envelope 3' of the lower shell 3 and which is capable of being closed by an access ramp 48 formed in the wall of the lower shell 3. Within the central body 42 are provided stairs and/or hoists which connect the lower boarding region of the central body 42 level with the corridor 47 to the upper region giving access to the transport links 44, 45, 46.

It can also be seen in FIG. 2 that the propulsion units 7, 8, 9, 10 are of angled design, in each case an engine 49, 50, 51, 52 being arranged transversely to the aircraft longitudinal center plane running through the central body and the cockpit extension, said engine preferably lying horizontally. At the same time, the front engines 49, 50 are oriented coaxially to the respective front upper transverse links 15 and 18, whilst the rear engines 51, 52 are oriented coaxially to the respectively associated rear lower transverse links 22 and 25. The axes of the engines 49, 50, 51, 52 therefore lie in a plane parallel to the equatorial plane of the aircraft.

Each of the engines 49, 50, 51, 52 is connected to a front portion 53, 54 or a rear portion 55, 56, respectively, of the associated propulsion unit via an angular gear, not illustrated in the figures, of which the respective input shaft is connected to the driven shaft of the associated engine and of which the output shaft acting on the respective propeller is located in a plane running at right angles to the axis of rotation of the respective engine. In the illustration in FIG. 2, moreover, the output shafts lie horizontally. The presence of the angular gear in each propulsion unit 7, 8, 9, 10 is apparent from the angled design of the propulsion units 7, 8, 9, 10 which is illustrated in FIG. 2.

Each propulsion unit 7, 8, 9, 10 is mounted rotatably about the axis of rotation of its associated engine 49, 50, 51, 52, in such a way that the respective front portion 53, 54 of the front propulsion units 7, 8, said front portion lying horizontally in FIG. 2, and the rear portion 55, 56 of the respective rear propulsion unit 9, 10, said rear portion lying horizontally in FIG. 2 and in each case containing the associated output shaft of the drive, are tiltable between the horizontal orientation illustrated in FIG. 2 and a vertical orientation.

Figure 3:
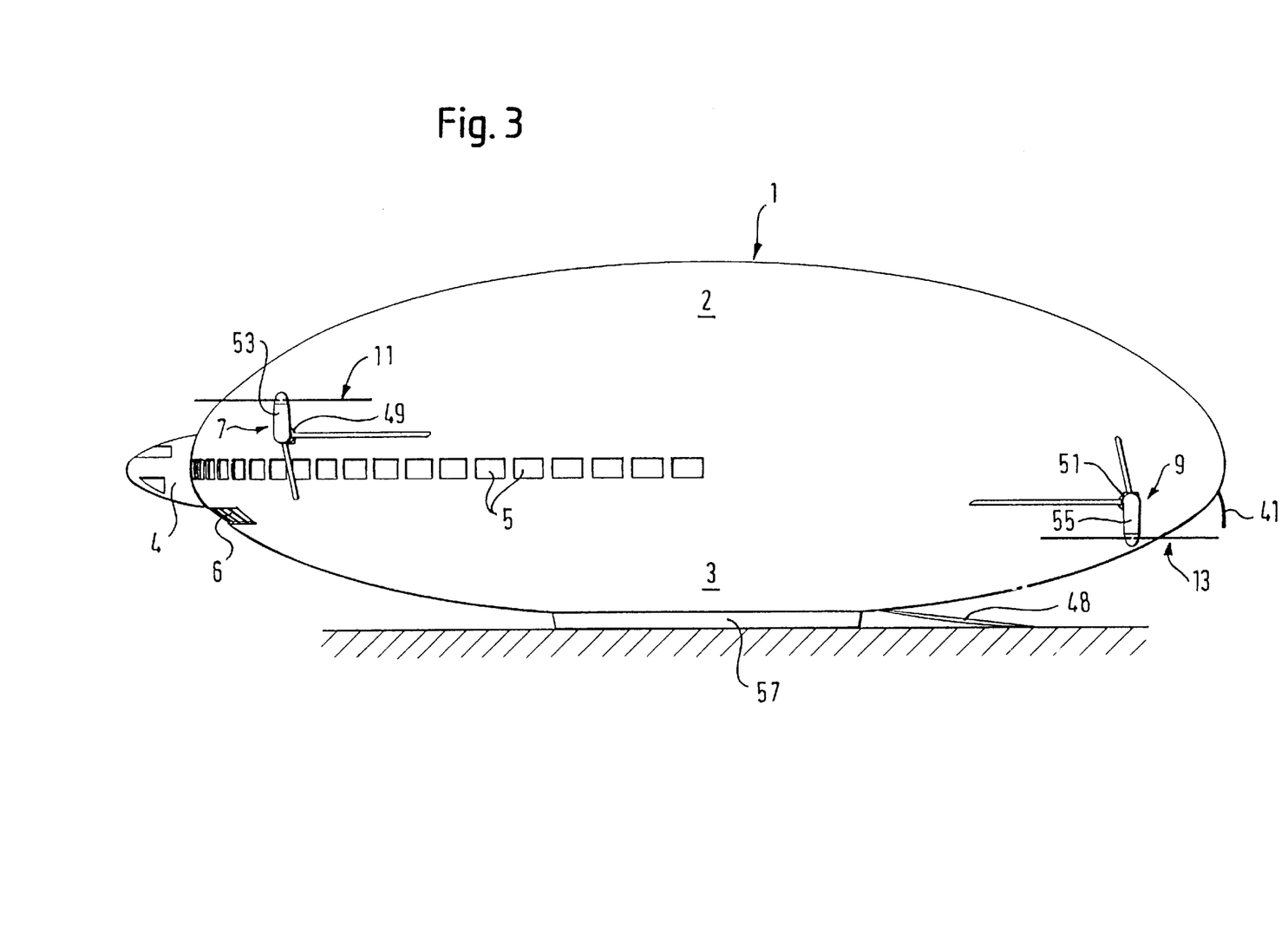
FIG. 3 shows an aircraft according to the invention in a passenger transport version in the landing condition on unprepared ground.

FIG. 3 illustrates the aircraft in a side view in the landed state, in which the portions 53, 54, 55, 56 of the propulsion units 7, 8, 9, 10, in which portions the respective output shaft is located, are tilted into the vertical. The respective propeller rotation plane of the propulsion units 7, 8, 9, 10 therefore runs horizontally in FIG. 3, and FIG. 3 therefore also at the same time shows the take-off and landing position of the propulsion units.

The opened flap 41 of the baggage and freight compartment 39 and the lowered access ramp 48 of the corridor 47 to the central body 42 are also apparent in FIG. 3. There can be seen below the lower shell 3 of the fuselage 1 a bellows-like annular bead 57 which is extended downward from the lower wall of the lower shell 3 and on which the landed aircraft rests, the annular bead 57 serving as a landing foot.

It can also be seen in FIG. 3 that the front propulsion unit 7 and also the front propulsion unit 8, not illustrated, are tilted upward relative to the cruising position illustrated in FIG. 1, so that the plane of the propeller 11 is located above the associated engine 49, and so that the plane of the propeller 13 of the rear propulsion unit 9, and of the rear propulsion unit 10 which cannot be seen, lies below the associated engine 51. This different position of the respective propeller plane is brought about because the front propellers are traction propellers and the rear propellers are pusher propellers, so that, by means of the arrangement shown in FIG. 3, both the front propulsion units and the rear propulsion units can generate an upwardly directed thrust.

Figure 4:
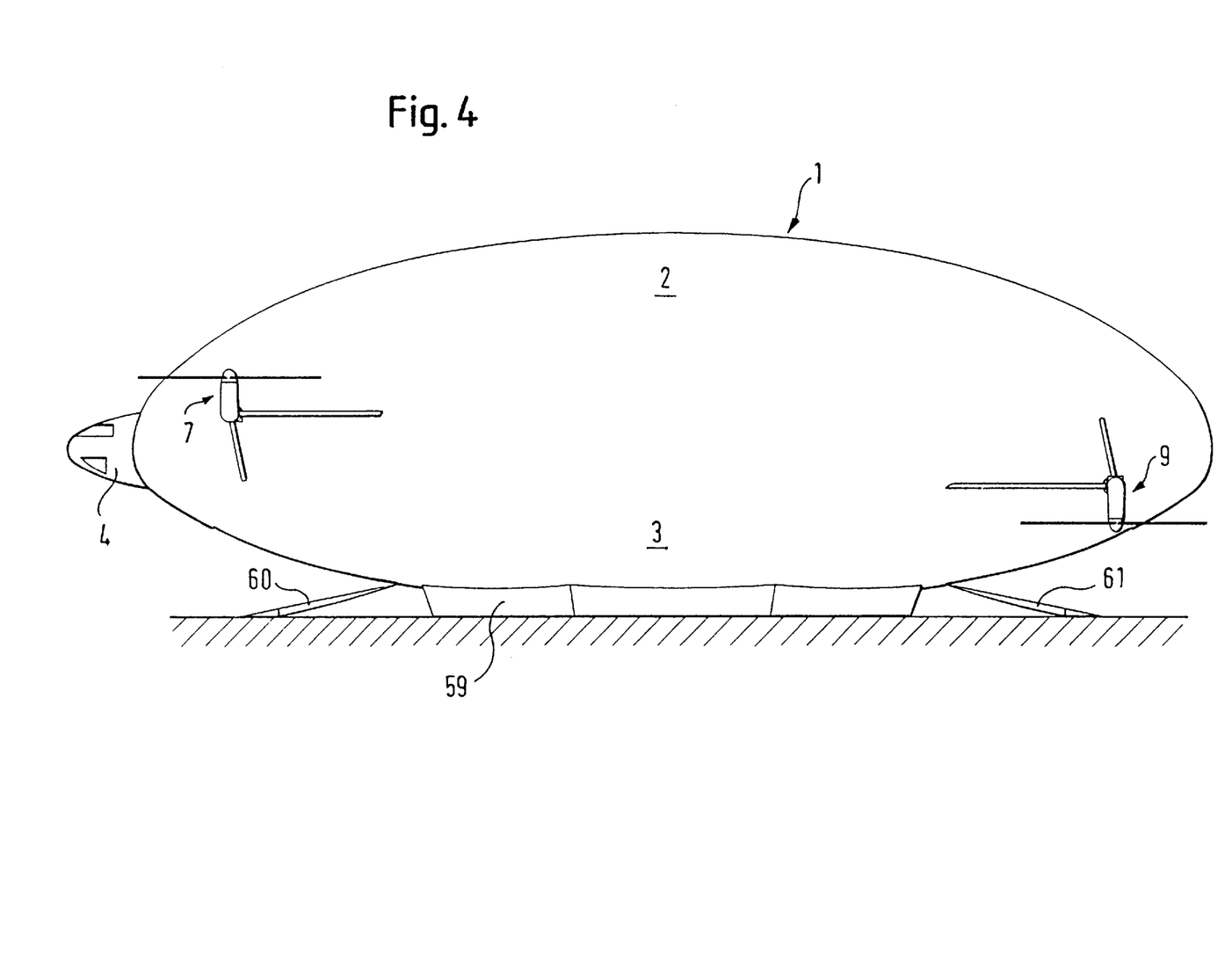
FIG. 4 shows an aircraft according to the invention in a cargo transport version in the landing condition on unprepared ground.

FIG. 4 shows an embodiment of the aircraft according to the invention, designed as a cargo transport version, in the same operating condition as that in FIG. 3 for the passenger transport version. In this cargo transport version, the windows 5 and 6 in the fuselage 1, which are provided in the passenger transport version, are absent. Instead, the lower shell 3 has formed in it a cargo compartment 58 (FIG. 5), illustrated in FIG. 5, which is essentially octagonal, as seen in a plan view, and which is provided, below its bottom, with a bellows-like annular bead 59 which is adapted to the plan contour and is directed downward and which functions as a landing foot in the same way as the annular bead 57 in the passenger transport version, but delimits a larger base area, adapted to the plan contour of the cargo compartment, than the annular bead 57 of the passenger transport version.

Furthermore, in the cargo transport version shown in FIG. 4, a front ramp 60 and a rear ramp 61 are provided in the wall of the lower shell 3, which lead respectively from the front and from the rear through a front corridor 62 and a rear corridor 63 to the cargo compartment 58 (FIG. 5) and which make it easier for the cargo compartment 58 to be loaded and unloaded simultaneously.

Figure 5:
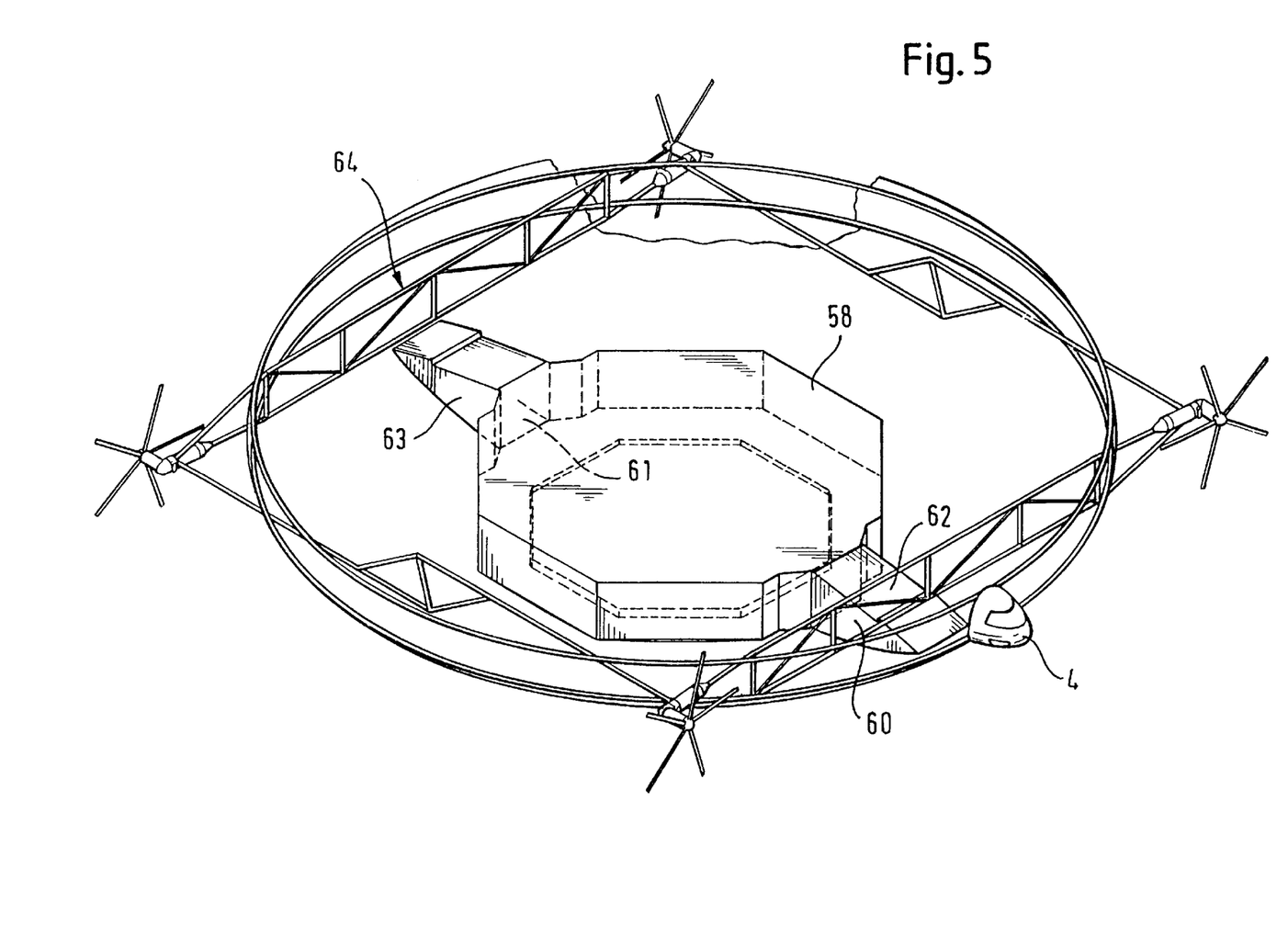
FIG. 5 shows an isometric sectional view of an aircraft according to the invention in a cargo transport version.

FIG. 5 reproduces an isometric view of the cargo transport version, shown partly in section, of the aircraft according to the invention, the view of FIG. 5 corresponding basically to the view of the passenger transport version in FIG. 2. In this version, the design of the propulsion support frame 64 also corresponds basically to the propulsion support frame 35 of the passenger transport version. The fuselage 1, together with the upper shell 2 and lower shell 3 and the rim-like reinforcing ring 27, also corresponds basically to the passenger transport version illustrated in FIG. 2. In order to avoid repetition, therefore, reference is made to the description of FIG. 2 where the description of these essentially identically designed structural elements and of the essentially identically designed propulsion units is concerned. The cargo compartment 58 is located essentially in the region of the lower shell 3 of the fuselage 1 and the upper wall of the cargo compartment 58 is at a clear distance from the upper wall of the upper shell 2, in order, here too, to make it possible for the cargo compartment 58 to have a springing effect and therefore to allow the propulsion support frame 64 to be cushioned. The height of the cargo compartment 58 is, at most, about one quarter of the total height of the aircraft.

Figure 6:
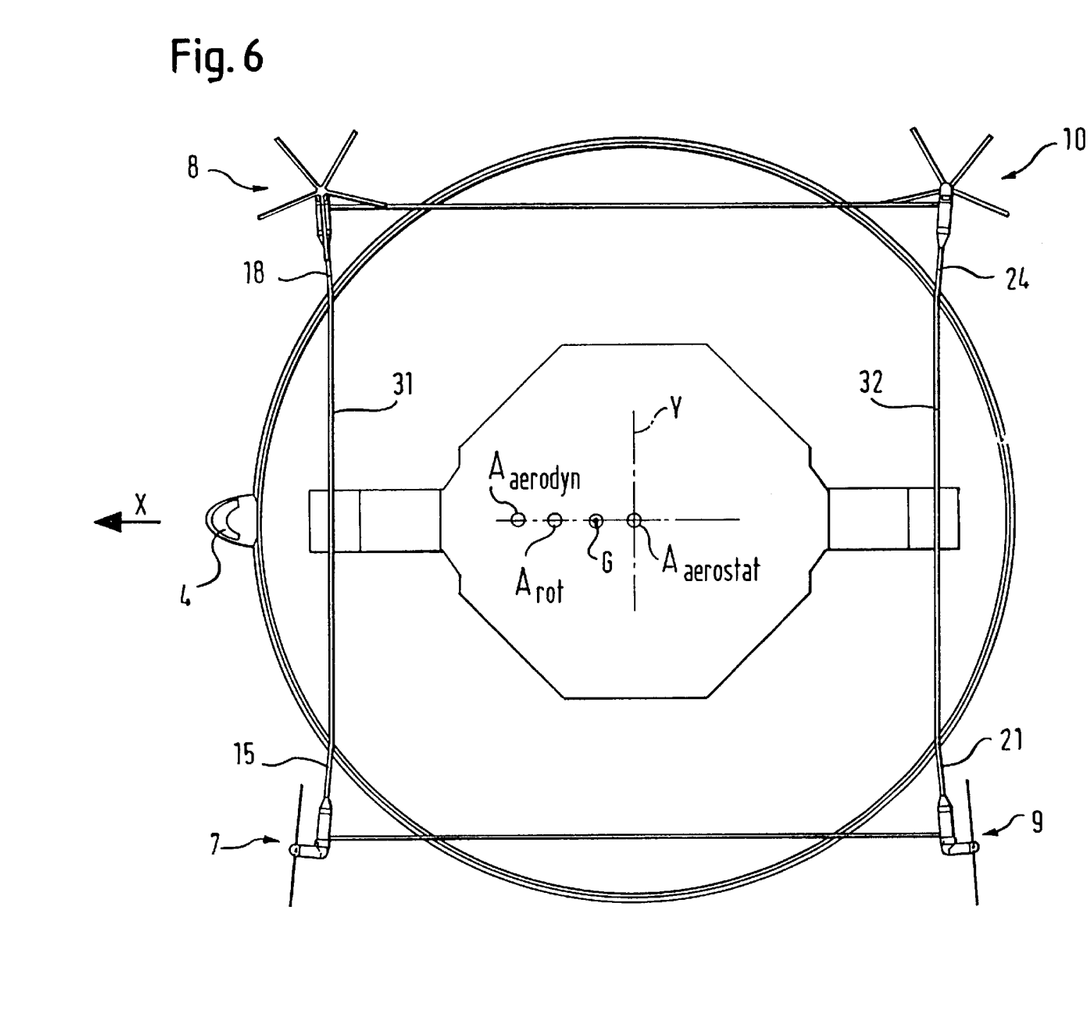
FIG. 6 shows a sectional top view of an aircraft according to the invention in a cargo transport version, with a propulsion support frame for the front and the rear propulsion units.

FIG. 6 illustrates the cargo transport version from FIGS. 4 and 5 once again in a sectional plan view, the front right propulsion unit 8 being shown on the right side, as seen in the direction of flight X, and the rear right propulsion unit 10 being shown in its vertical flight position (with the horizontal propeller plane), and the propulsion units on the left, as seen in the direction of flight, namely the left front propulsion unit 7 and the left rear propulsion unit 9, being illustrated in the cruising position (with a vertical propeller plane). This illustration, with propulsion units tilted differently, serves merely for a clearer understanding; it does not represent a real flying state.

The propulsion units are advantageously arranged in the longitudinal direction, as regards the lift distribution, in such a way that, during vertical take-off, the resultant of the lift center of gravity of all the drive units $A_{rot}$ and of the aerostatic lift of the fuselage volume $A_{aerostat}$ passes through the mass center of gravity G of the aircraft. The mass distribution and the distribution of the aerostatic lift $A_{aerostat}$ are, in this case, advantageously organized in such a way that the mass center of gravity G is so far in front of the aerostatic lift center that, after the failure of all the propulsion units, for example because of a lack of fuel, a gliding flight stable in terms of flight mechanics is established at a preselected low flying speed. FIG. 6 correspondingly indicates the points by way of example, the respective designation $A_{aerodyn}$ indicating the application point of a resultant aerodynamic lift, $A_{aerostat}$ indicating the application point of the aerostatic lift of the fuselage volume, $A_{rot}$ indicating the lift center of gravity of all the propulsion units and G indicating the mass center of gravity of the aircraft.

It is clearly apparent from the illustration of FIG. 6 that the respective transverse links 15, 16; 18, 19; 21, 22; 24, 25, of which only the upper transverse link can be seen in each case, are directed slightly outward relative to the aircraft transverse axis y, from the middle portion of the front supporting structure 31, said middle portion being located within the fuselage, or from the middle portion of the rear supporting structure 32, said middle portion being located within the fuselage, that is to say are angled forward from the front supporting structure 31 and rearward from the rear supporting structure 32. The oblique position, thereby obtained, of the propeller planes during cruising, with respect to a vertical plane through the transverse axis of the aircraft, can also be seen in the side view of FIG. 1. This oblique position ensures that the air flow flowing round the aircraft flows essentially axially onto the propeller when the latter is in its normal position in the cruising state (FIG. 1).

Figure 7:
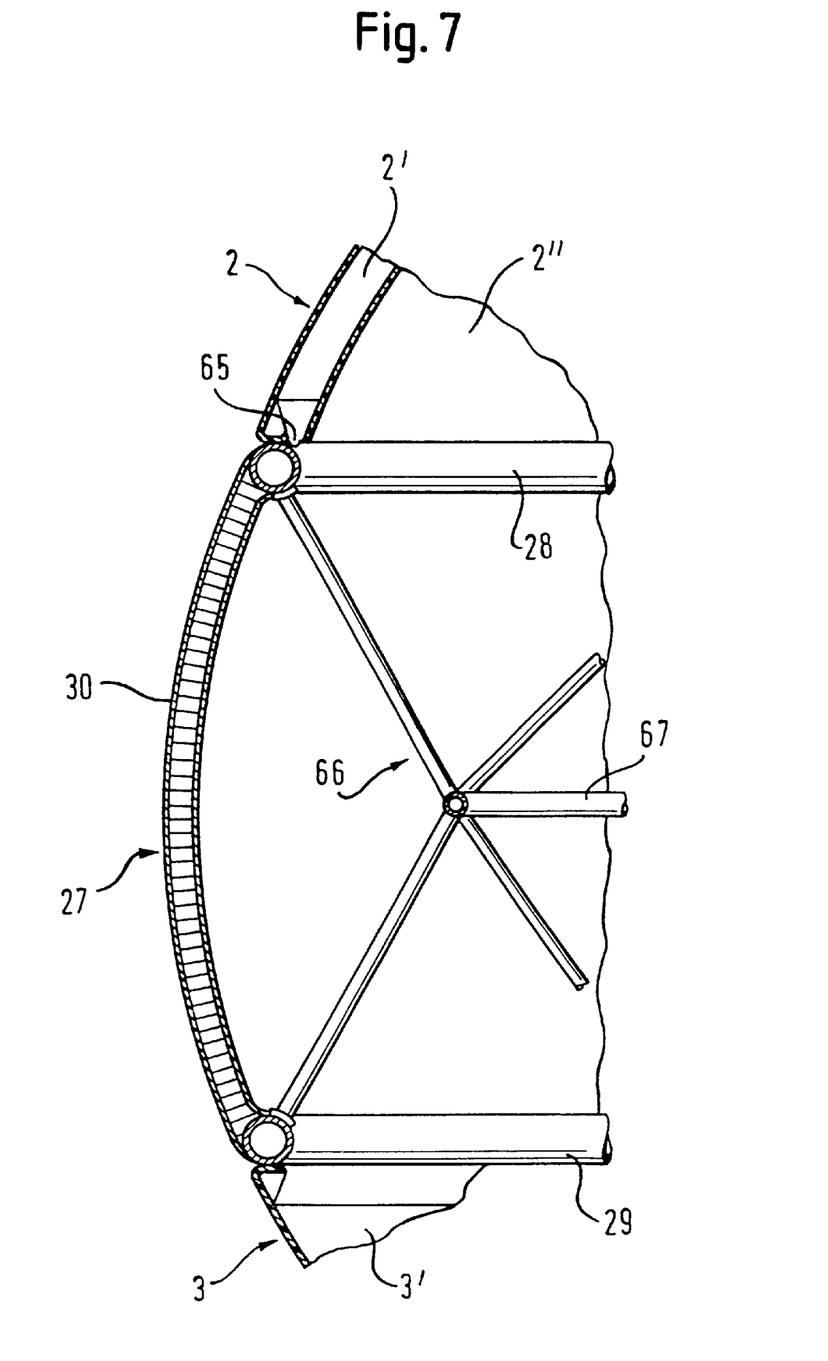
FIG. 7 shows a detail of a partially sectional side view of an aircraft according to the invention with a reinforcing ring and a supporting structure.

FIG. 7 shows a detail of a partially sectional side view of an aircraft according to the invention in the equatorial region. The reinforcing ring 27 has a tubular upper supporting profile 28 and a tubular lower supporting profile 29 which are laminated into a sandwich-like annular wall 30 on the upper circumference and the lower circumference of the latter respectively. The contour of the wall 30 is curved convexly outward in a part-elliptic manner. The fuselage envelope 2' of the upper shell 2 and the fuselage envelope 3' of the lower shell 3 are fastened to the upper supporting profile 28 and to the lower supporting profile 29 respectively via suitable fastening devices. For this purpose, the respective supporting profile 28, 29 can have a suitable profiled cross-sectional shape which differs from the circular shape illustrated in FIG. 7 and which makes it possible to attach corresponding fastening parts of the respective fuselage envelope 2', 3' to the associated upper supporting profile 28 and to the lower supporting profile 29 respectively.

The fuselage envelope is formed by a suitable flexible material, such as is already used, for example, in airship construction. The terms "upper shell" and "lower shell", chosen in the present application, do not mean that these are rigid structures, but merely designate the geometric shape when the fuselage is in the pressurized state.

The upper shell 2 is of double-walled design, an inner envelope 2" being spaced from the outer envelope 2' and forming a channel, into which open outflow orifices 65 formed in the upper supporting profile 28. The space formed between the outer envelope 2' and the inner envelope 2" may also be subdivided meridionally into a multiplicity of channels. A central upper outflow orifice, not shown, is provided in the outer envelope 2' at the uppermost point of the upper shell 2. Warm air supplied through the upper supporting profile 28 can thereby flow out of the orifices 65 into the channels formed between the inner envelope 2" and the outer envelope 2' and escape again from the central upper outflow orifice, the warm air heating the outer envelope 2' and therefore making it possible to deice the outer envelope.

FIG. 7 also shows a framework-like supporting skeleton 66 which is located on the radially inner side of the reinforcing ring 27 and which connects the upper supporting profile 28 and the lower supporting profile 29, including an inner annular supporting profile 67. The supporting skeleton 66 serves for strengthening the reinforcing ring 27.

For control purposes, the aircraft designed without conventional aerodynamic control devices has special propulsion units 7, 8, 9, 10 which, by virtue of a specially designed rotor head 110 with an inclinable propeller rotation plane 113, allow thrust vector control by means of the propeller.

A rotor head 110 of a propulsion unit of this type and a modification of this are described below with reference to FIGS. 8 and 9.

Figure 8:
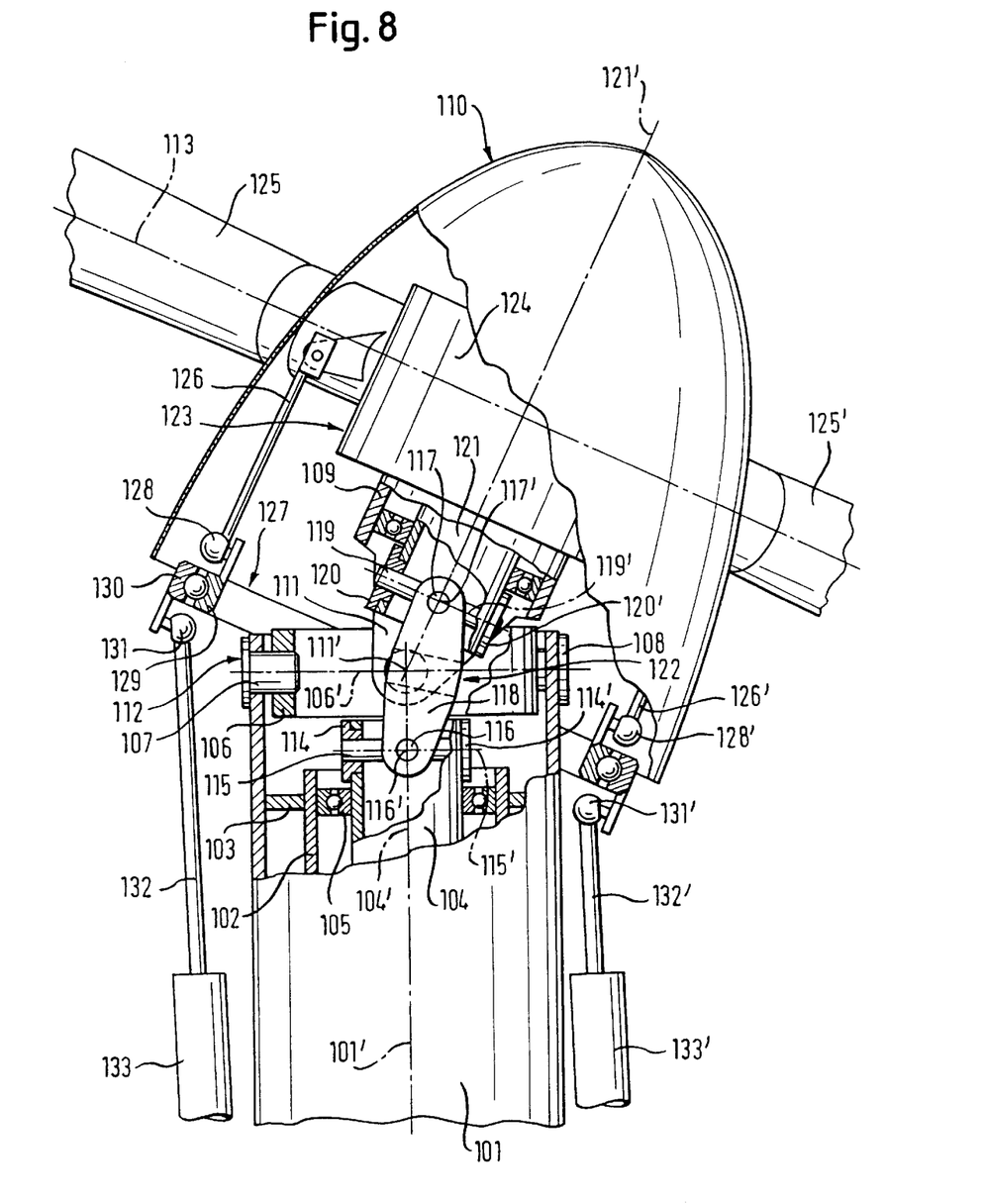
FIG. 8 shows a partially sectional side view of an inclinable propulsion system in a first embodiment.

FIG. 8 illustrates a first embodiment of a rotor head according to the invention of one of the propulsion units 7, 8, 9, 10. The rotor head has, in its lower part, as seen in FIG. 8, a hollow-cylindrical front portion 101 of a propeller support structure or drive housing, said portion corresponding to the front portions 53, 54 of the front propulsion units 7, 8 or to the rear portions 55, 56 of the rear propulsion units 9, 10 of the aircraft according to the invention.

Arranged inside the front portion 101 coaxially to this is an inner cylindrical auxiliary carrier tube 102 which is connected to the cylindrical front portion 101 via annular spacers 103.

A shaft 104 is rotatably mounted via bearings 105 within the inner cylindrical auxiliary carrier tube 102 coaxially to the latter. The shaft 104 is the output shaft of one of the engines 49, 50, 51, 52 illustrated diagrammatically in FIG. 2. Said shaft may be arranged coaxially to the rotary shaft of the associated engine or, as in the example of FIGS. 1 to 7, may be connected to the rotary shaft of the engine via an angular gear. Moreover, the shaft 104 may be the output shaft of a reduction gear or gear assembly located downstream of the engine.

At the free end of the cylindrical front portion 101 of the propeller support structure or drive housing, a cardan ring 106 is pivotably mounted, within the hollow-cylindrical casing of the front portion 101, on said casing. Here, the pivot axis 106' of the cardan ring 106 is at right angles to the longitudinal axis 101' of the cylindrical front portion 101. The cardan ring 106 is mounted on the hollow-cylindrical front portion 101 in a known way via bearing bolts 107, 108.

Within the cardan ring 106, a cylindrical support tube 109 of the propeller hub 110 is pivotably mounted in the cardan ring 106 by means of two bearing plates 111 projecting axially at the lower end of the hollow-cylindrical support tube 109 on two radially opposite sides. The inclination axis 111', about which the bearing plates 111 and consequently the hollow-cylindrical support tube 109 pivot, is perpendicular to the longitudinal axis 109' of the hollow-cylindrical carrier tube 109 and perpendicular to the pivot axis 106' of the cardan ring 106. An outer cardan joint 112 is thereby formed, the center point of which is formed by the intersection point of the axes 101', 106' and 111' and which makes it possible for the propeller plane 113 to be inclinable in any desired directions with respect to the longitudinal axis 101' of the front portion 101 of the propeller support structure or drive housing, said longitudinal axis at the same time forming the axis of rotation 104' of the output shaft 104.

Provided in the region of the free end of the output shaft 104 are two diametrically opposite lower inner pivot bearings 114, 114', in which is mounted an axle 115 which passes diametrically through the output shaft 104 and the pivot axis 115' of which is at right angles to the axis of rotation 104' of the output shaft 104, said axis of rotation itself running coaxially to the longitudinal axis 101' of the front portion 101. In order to form a lower cardan cross, the axle 115 is provided in its center (as seen in the longitudinal direction) with two laterally attached pivot pins 116, the pivot axis 116' of which is at right angles to the pivot axis 115'.

Pivotably mounted on each of the pivot pins 116 is a connecting shaft 118 which extends away from the free end of the hollow output shaft 104 and which, at its end facing away from the pivot pins 116, is mounted on pivot pins 117, the pivot axis 117' of which runs parallel to the pivot axis 116'. In order to form an upper cardan cross, the pivot pins 117 are attached laterally to and in the center (as seen in the longitudinal direction) of an axle 119, the pivot axis 119' of which runs at right angles to the pivot axis 117'.

The axle 119 is pivotably mounted in two upper inner pivot bearings 120, 120' which are provided in the region of the free end of a propeller shaft 121 so as to pass diametrically through the latter. The axis of rotation 121' of the propeller shaft 121 is perpendicular to the propeller rotation plane 113 and to the pivot axis 119'.

An inner double cardan joint 122 is thereby formed, the joint crosses of which are positioned equidistantly from the center point of the outer cardan joint 112. This ensures that, when the propeller rotation plane 113 is inclined, the angles between the axes of rotation of the output shaft 104 and of the connecting shaft 118 and between the axes of rotation of the connecting shaft 118 and the propeller shaft 121 are in each case of equal size and correspond to half the angle of inclination of the propeller rotation plane 113. The double cardan joint installed in this way transmits the rotation of the output shaft 104 to the propeller shaft 121 uniformly in any desired inclined position of the propeller rotation plane 113.

The axis of rotation 121' of the propeller shaft 121 and the axis of rotation 104' of the output shaft 104 intersect in the center of the outer cardan joint 112, hat is to say at the intersection point of the pivot axis 106' of the cardan ring 106 and of the inclination axis 111' of the bearing plates 111.

Provided in the propeller hub 110 is a planetary gear 123, the sun wheel of which is connected to the propeller shaft 121 and on the ring gear 124 of which the propeller blades 125 are mounted. The planet wheels of the planetary gear 123 are mounted on a planet carrier connected fixedly in terms of rotation to the cylindrical support tube 109.

The mounting of the propeller blades 125, 125' on the ring gear 124 is designed in such a way that the angles of incidence of the propeller blades 125, 125' are adjustable. For this purpose, each propeller blade 125, 125' is connected in an articulated manner to a swashplate 127 via an associated upper adjusting rod 126, 126' by means of a respective upper ball joint 128, 128'. The swashplate 127 consists of an inner bearing ring 129 and of an outer bearing ring 130, the upper ball joints 128, 1281 being arranged on the inner bearing ring 129. The plane of the annular swashplate 127 runs through the center point of the outer cardan joint 112, but it may also be offset toward the propeller hub.

Provided on the outer bearing ring 130 of the swashplate 127 are lower ball joints 131, 131', on which are mounted lower adjusting rods 132, 132' which run along the front portion 101 of the propeller support structure or drive housing and which are axially adjustable via associated piston/cylinder units 133, 133'. The piston/cylinder units 133, 133' are arranged outside the front portion 101, but they may also be arranged within the tubular front portion 101 between the latter and the inner cylindrical auxiliary support tube 102.

By means of the piston/cylinder units 133/133', the lower adjusting rods 132, 132', the swashplate 127 and the upper adjusting rods 126, 126', not only can the angle of incidence of each propeller blade 125, 125' be adjusted individually, but also collective adjustment of the angles of incidence of the propeller blades by the amount of a difference in angle of incidence common to all the propeller blades can be carried out via this adjusting mechanism.

Figure 9:
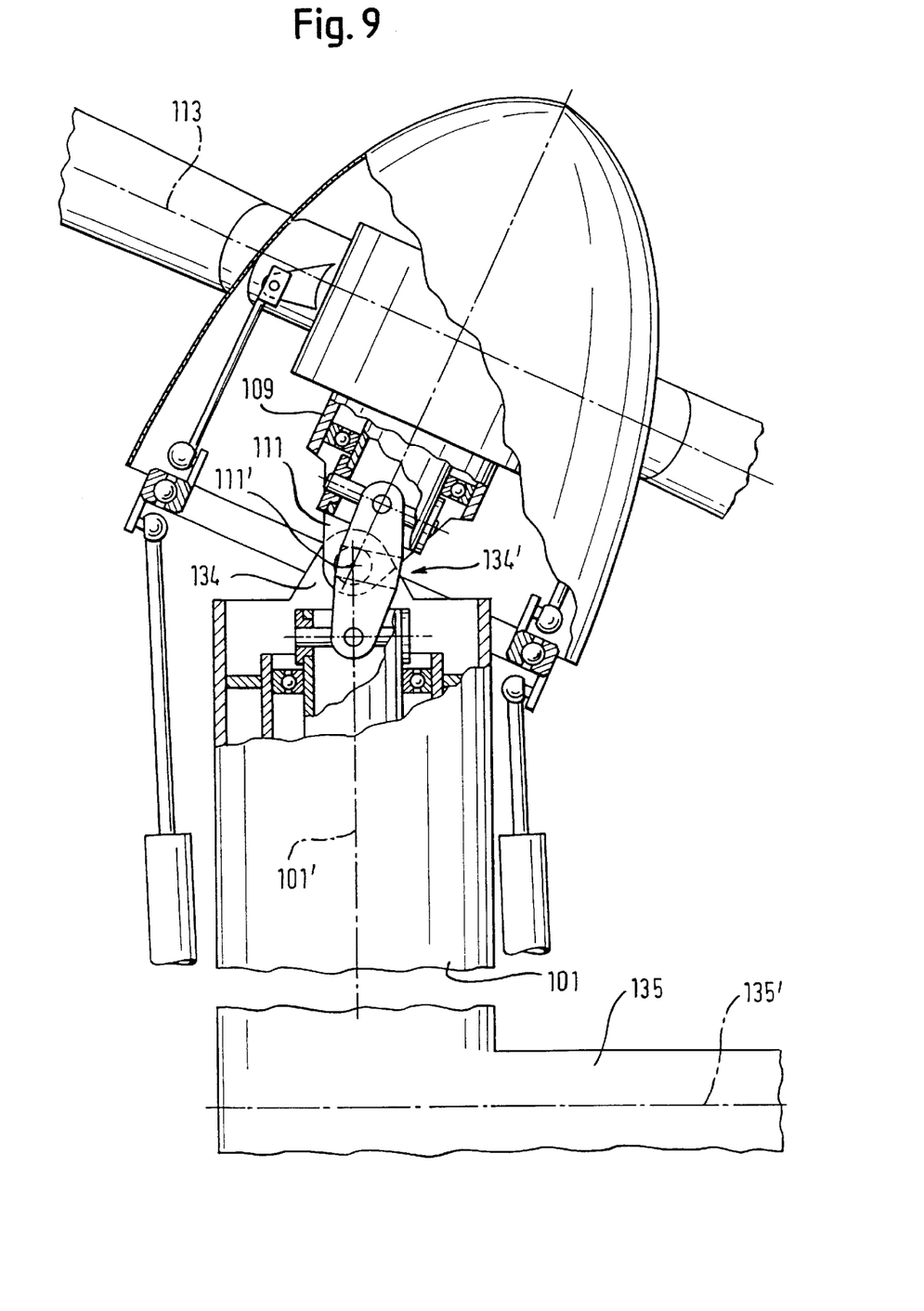
FIG. 9 shows a partially sectional side view of an inclinable propulsion system in a second embodiment.

FIG. 9 shows a modification of the rotor head from FIG. 8, in which the outer cardan joint 112 has been replaced by a simple joint pivotable about an axis, as explained below in terms of the differences from the rotor head of FIG. 8.

Provided at the upper free end, in FIG. 9, of the front portion 101 of the propeller support structure or drive housing are lower bearing plates 134 which project from the end face of the free end of the cylindrical front portion 101 in the longitudinal direction of said front portion and which are arranged on two diagonally opposite sides of the front portion 101. The bearing plates 111 of the cylindrical support tube 109 of the propeller hub are pivotably mounted on the lower bearing plates 134, the inclination axis 111' being perpendicular to the longitudinal axis 101' of the front portion 101. An inclination joint 134' is thereby formed. Moreover, the axes 101' and 111' in each case run at right angles to a tilting axis 135' of a fastening arrangement 135 for fastening the drive device to the aircraft.

Where this rotor head is concerned, the propeller rotation plane 113 may likewise be inclined in any desired direction, since the tilting axis 135' gives the degree of freedom which is given by the pivot axis 106' of the cardan ring 106 in the design according to FIG. 8.

The fastening device 135 tiltable about the tilting axis 135' may also be provided in the embodiment, shown in FIG. 8, having the outer cardan joint 112.

The invention is not restricted to the above exemplary embodiment which serves merely for a general explanation of the essential idea of the invention. On the contrary, within the scope of protection, the device according to the invention may also assume embodiments other than those described above. In this case, the device may, in particular, have features which constitute a combination of the respective individual features of the claims.

Reference symbols in the claims, the description and the drawings serve merely for a clearer understanding of the invention and are not intended to restrict the scope of protection.

List of reference symbols

| | |
|---|---|
| 1 | Fuselage |
| 2 | Upper shell |
| 2' | Outer envelope |
| 2" | Inner envelope |
| 3 | Lower shell |
| 3' | Envelope |
| 4 | Cockpit extension |
| 5 | Window |
| 6 | Panorama window |
| 7 | Left front propulsion unit |
| 8 | Right front propulsion unit |
| 9 | Left rear propulsion unit |
| 10 | Right rear propulsion unit |
| 11 | Left front propeller |
| 11' | Propeller blades |
| 12 | Right front propeller |
| 12' | Propeller blades |
| 13 | Left rear propeller |
| 13' | Propeller blades |
| 14 | Right front propeller |
| 14' | Propeller blades |
| 15 | Left front upper transverse link |
| 16 | Left front lower transverse link |
| 17 | Left front longitudinal link |
| 18 | Right front upper transverse link |
| 19 | Right front lower transverse link |
| 20 | Right front longitudinal link |
| 21 | Left rear upper transverse link |
| 22 | Left rear lower transverse link |
| 23 | Left rear longitudinal link |
| 24 | Right rear upper transverse link |
| 25 | Right rear lower transverse link |
| 26 | Right rear longitudinal link |
| 27 | Reinforcing ring |
| 28 | Upper supporting profile |
| 29 | Lower supporting profile |
| 30 | Annular wall |
| 31 | Front supporting structure |
| 32 | Rear supporting structure |
| 33 | Left framework-like structure |
| 34 | Right framework-like structure |
| 35 | Propulsion support frame |
| 36 | Left thrust strut |
| 37 | Right thrust strut |
| 38 | Passenger cabin |
| 39 | Baggage and freight compartment |
| 40 | Well |
| 41 | Flap |
| 42 | Central body |
| 43 | Landing foot |
| 44 | Transport link |
| 45 | Transport link |
| 46 | Transport link |
| 47 | Corridor |
| 48 | Access ramp |
| 49 | Left front engine |
| 50 | Right front engine |
| 51 | Left rear engine |
| 52 | Right rear engine |
| 53 | Front portion |
| 54 | Front portion |
| 55 | Rear portion |
| 56 | Rear portion |
| 57 | Bellows-like annular bead |
| 58 | Cargo compartment |
| 59 | Annular bead |
| 60 | Front ramp |
| 61 | Rear ramp |
| 62 | Front corridor |
| 63 | Rear corridor |
| 64 | Propulsion support frame |
| 65 | Orifices |
| 66 | Supporting skeleton |
| 67 | Inner supporting profile |
| 101 | Front portion |
| 101' | Longitudinal axis of 101 |
| 102 | Inner cylindrical auxiliary support tube |
| 103 | Annular spacer |
| 104 | Output shaft |
| 104' | Axis of rotation of 104 |
| 105 | Bearing |
| 106 | Cardan ring |
| 106' | Pivot axis of 106 |
| 107 | Bearing bolt |
| 108 | Bearing bolt |
| 109 | Cylindrical support tube |
| 109' | Longitudinal axis of 109 |
| 110 | Propeller hub |
| 111 | Bearing plates |
| 111' | Inclination axis of 111 |
| 112 | Outer cardan joint |
| 113 | Propeller rotation plane |
| 114 | First lower inner pivot bearing |
| 114' | Second lower inner pivot bearing |
| 115 | Axle |
| 115' | Pivot axis of 115 |
| 116 | Pivot pin |
| 116' | Pivot axis of 116 |
| 117 | Pivot pin |
| 117' | Pivot axis of 117 |
| 118 | Connecting shaft |
| 119 | Axle |
| 119' | Pivot axis of 119 |
| 120 | First upper inner pivot bearing |
| 120' | Second upper inner pivot bearing |
| 121 | Propeller shaft |
| 121' | Axis of rotation of 121 |
| 122 | Double cardan joint |
| 123 | Planetary gear |
| 124 | Ring gear |
| 125 | Propeller blade |
| 125' | Propeller blade |
| 126 | Upper adjusting rod |
| 126' | Upper adjusting rod |
| 127 | Swashplate |
| 128 | Upper ball joint |
| 128' | Upper ball joint |
| 129 | Inner bearing ring |
| 130 | Outer bearing ring |
| 131 | Lower ball joint |
| 131' | Lower ball joint |
| 132 | Lower adjusting rod |
| 132' | Lower adjusting rod |
| 133 | Piston/cylinder unit |
| 133' | Piston/cylinder unit |
| 134 | Lower bearing plate |
| 134' | Inclination joint |
| 135 | Fastening arrangement |
| 135' | Tilting axis of 135 |

What is claimed is:

1. A drive unit for mounting to a vehicle at one end and driving at least one propeller (125) having individual propeller blades at a propeller hub (110) through a propeller shaft (121) with a tiltable propeller rotation plane (113) at the other end relative to the vehicle, the propeller hub (110) being rotatably mounted to a hub support (109), the drive unit comprising in combination:

a drive output shaft (104) having an axis of rotation;

a drive device (49, 50, 51, 52) having a drive housing and the drive output shaft (104) driven by a drive engine, the drive device for tilting the axis of rotation of the drive output shaft (104) relative to the vehicle;

a propeller shaft (121) for driving the at least one propeller (125) to rotate in a propeller rotation plane (113);

a first articulated connection (122) between a propeller shaft (121) and the drive output shaft (104) to enable uniform rotation of the propeller shaft (121) relative to the drive output shaft (104);

a second articulated connection (112; 134', 135') between the drive housing and the hub support (109), the first and second articulated connections providing all-round inclination of the propeller shaft (121) relative to the drive output shaft (104); and, means for cyclically variable individual adjustment of the the angle of incidence at the individual propeller blades of the at least one propeller (125) whereby the relative inclination of the propeller shaft (121) is individually adjustable relative to the output shaft (104) to vary the propeller rotation plane (113) relative to the output shaft (104) without transmission of a tilting moment of reaction from the at least one propeller (125) through the propeller shaft (121) to the vehicle.

2. The drive unit for mounting to a vehicle according to claim 1 and wherein:

the means for cyclically variable individual adjustment of the angle of incidence includes an adjustable swashplate (127) extending between the drive device (49, 50, 51, 52) and the at least one propeller (125).

3. The drive unit for mounting to a vehicle according to claim 2 wherein:

the means for cyclically variable individual adjustment of the angle of incidence at the individual propeller blades of the at least one propeller (125) includes collective adjustment.

4. The drive unit for mounting to a vehicle according to claim 1 wherein:

the hub (110) of the propeller is cardanically mounted via a cardan ring (106) to the drive housing.

5. The drive unit for mounting to a vehicle according to claim 1 wherein:

the provided scope of all-round inclination of the propeller shaft (121) relative to the drive output shaft (104) is at least 45 degrees.

6. The drive unit for mounting to a vehicle according to claim 1 wherein:

a support device (135) for mounting the drive device (49, 50, 51, 52) to the vehicle is provided for allowing tilting movement of the axis of rotation of drive output shaft (104) relative to the vehicle between driving positions which are substantially vertically oriented with respect to the vehicle to driving positions which are substantially horizontally oriented with respect to the vehicle.

7. The drive unit for mounting to a vehicle according to claim 6 wherein:

the drive device (49, 50, 51, 52) actuates the tilting movement of the axis of rotation of drive output shaft (104) by fluid-dynamic forces acting on the propeller and resultant gyroscopic forces acting on the at least one propeller (125) having individual propeller blades.

8. The drive unit for mounting to a vehicle according to claim 7 and further including:

a tracking device to follow the tilting movement of the drive device.

9. The drive unit for mounting to a vehicle according to claim 8 wherein:

the tracking device assists the tilting movement of the drive device.

10. The drive unit for mounting to a vehicle according to claim 6 and further including:

an inclination joint (134') having an inclination axis (111') which runs perpendicular to the tilting axis (135') of the drive device (49, 50, 51, 52) to enable the inclination of the propeller hub (110) about the inclination axis (111').

11. The drive unit for mounting to a vehicle according to claim 8 and further including:

the adjusting speed of the tracking device for the tilting movement about the tilting axis (135') of the drive unit essentially corresponds to the adjusting speed of the fluid-dynamically induced inclination movement of the propeller rotation plane (113).

12. The drive unit for mounting to a vehicle according to claim 1 and further including:

the propeller hub (110) includes a reduction gear (123) to transmit from the output shaft (104) a reduced speed of rotation to the propeller hub (110).

13. The drive unit for mounting to a vehicle according to claim 12 wherein:

the reduction gear (123) is a planetary gear.

14. The drive unit as claimed in claim 1, wherein:

the propeller blades (125, 125') are arranged on the associated propeller hub 110 such that each propeller blade can only be rotated relative to the propeller hub to adjust the pitch angle of the propeller blade.

* * * * *